June 8, 1937.  H. L. COLE  2,083,431
DONKEY'S BRAY
Filed July 14, 1936
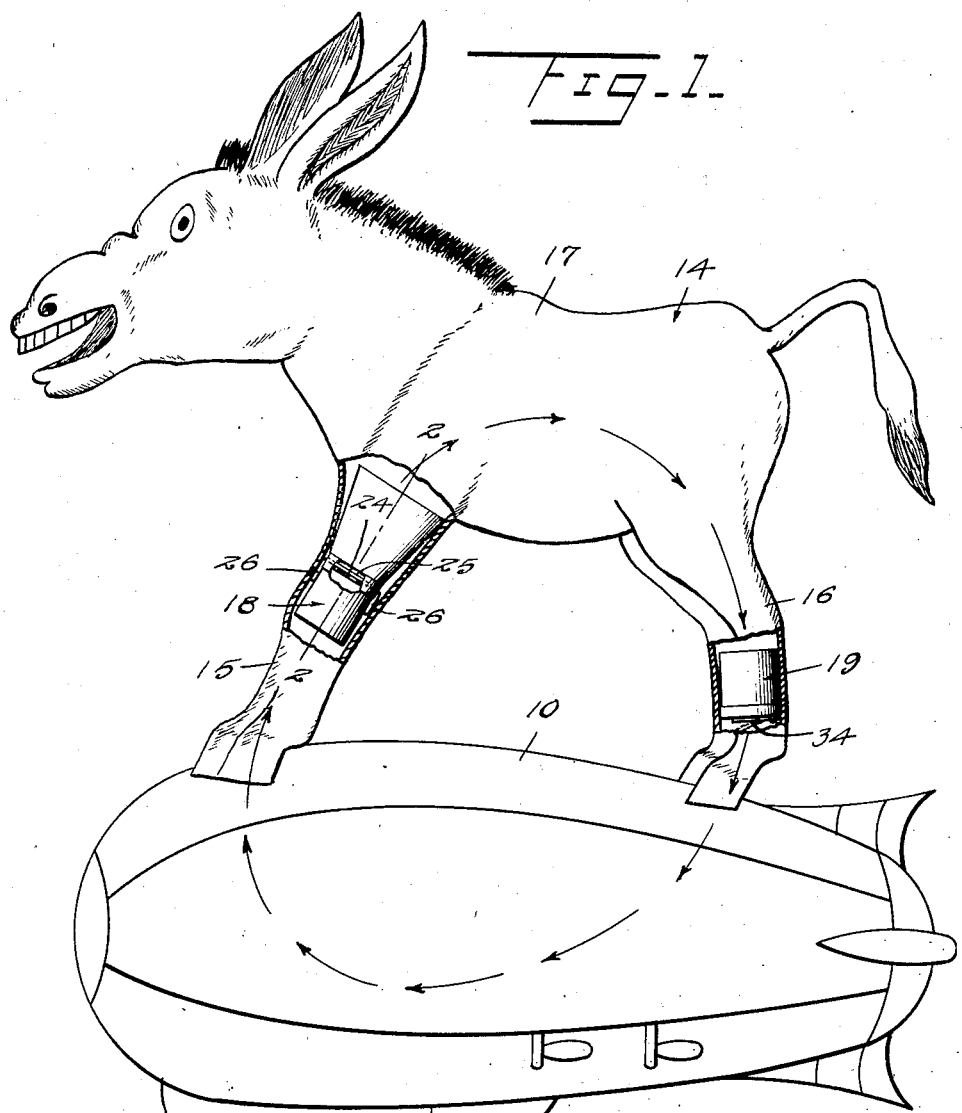
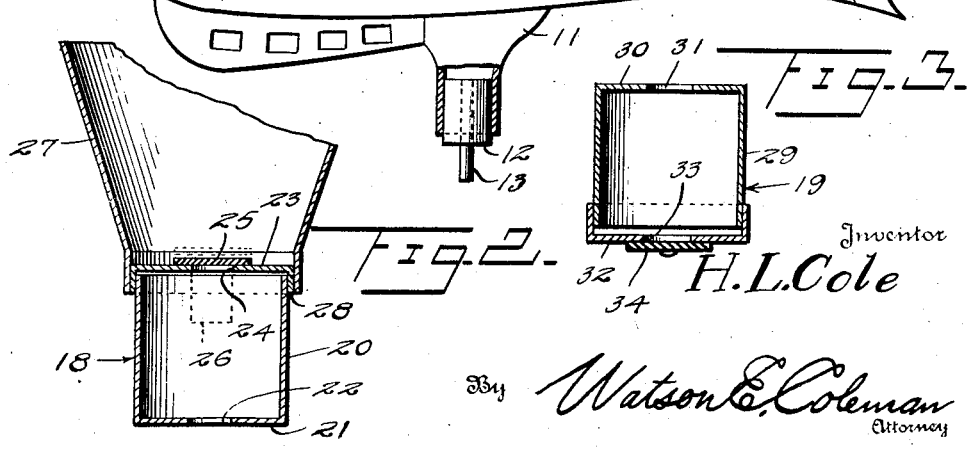
Inventor
H. L. Cole
By Watson E. Coleman
Attorney Patented June 8, 1937

2,083,431

UNITED STATES PATENT OFFICE 2,083,431

DONKEY'S BRAY

Homer L. Cole, Eldorado, Ill.

Application July 14, 1936, Serial No. 90,606

5 Claims. (Cl. 46—117)

This invention relates to sounding toys and more particularly to a toy adapted to simulate the bray of a donkey.

An object of this invention is to provide a toy which is of an inflatable construction and which includes a yieldable reservoir and a member secured to the reservoir in the form of an animal and, in the present instance, in the form of a donkey with the legs of the animal being hollow and communicating with the reservoir so that the sounding devices may be mounted within the hollow legs of the animal, in order to produce a sound upon collapsing of the animal or the reservoir.

Another object of this invention is to provide in a toy of this kind a closed circulating system with a pair of sounding devices in the system so that the movement of air through the system will effect a sounding of the sounding devices.

A further object of this invention is to provide a sounding device of this character which is pleasing in appearance and which, in the present instance, is constructed in the form of an animal mounted on a relatively large inflatable body with the animal having the appearance of an animal which is characteristic of one of the political parties.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a detail side elevation partly broken away and in section of a device constructed according to an embodiment of this invention.

Figure 2 is a sectional view taken on the line 2—2 of Figure 1.

Figure 3 is a sectional view through the whistling device.

Referring to the drawing, the numeral 10 designates generally a hollow body which is preferably constructed of rubber or other yieldable material and which, in the present instance, is constructed in the form of a dirigible which has a nipple 11 on the underside in which a plug 12 is mounted with the plug 12 having an opening therethrough which may be closed by a pin or removable plug 13.

A body 14 is mounted on the reservoir or hollow body 10 and, in the present instance, this body 14 is constructed in the form of an animal with the legs 15 and 16 of the animal secured to the upper side of the body 10 and communicating at their lower ends with the interior of the body 10 so that a continuous passage is provided from the reservoir or inflatable body 10 through one leg of the animal 14, then into the body 17 of the animal, and then down through the other leg of the animal 14, back to the reservoir 10.

A sounding device, generally designated as 18, is mounted in the leg 15 of the animal 14 and is adapted to be actuated by movement of air in one direction through the leg 15. A second sounding device 19 is mounted in the leg 16 of the animal and is adapted to be actuated by movement of air in reverse direction from the movement of air in the leg 15.

The sounding device 18 comprises a cylindrical body 20 which is secured within the interior of the leg 15 at a suitable point, and this body 20 is provided with a lower end wall 21 having an opening 22 for the passage of air. An upper wall or cap 23 is secured to the other end of the cylindrical member 20 and has an opening 24 which is covered by a yieldable reed 25. This reed 25 is substantially wider than the diameter or width of the opening 24 and, preferably, the reed 25 is constructed in the form of a strip of rubber, the ends 26 of which are extended down along the sides of the cylindrical member 20 and secured to the sides of the cylindrical member.

A horn 27 is secured to the flange 28 of the cap 23 and extends upwardly in the direction of the body 17 of the animal.

The sounding device 19 is constructed in the form of a whistle and comprises a cylindrical casing 29 having an upper end wall 30 provided with an opening 31. The other end of the casing or body 29 is closed by a cap 32 having a hole 33 which may be closed by a yieldable valve 34. This valve 34 is adapted to prevent movement of air through the body 29 in an upward direction but to permit the movement of air through the body 29 in a downward direction or in the direction of the reservoir 10.

In the use of this device, the reservoir 10 may be initially inflated by withdrawing the plug 13 and filling the reservoir 10, in addition to filling the body 17 of the animal 14. The plug 13 is then placed in position to prevent the release of air in the device. The device is operated by collapsing the body 17 of the animal 14 which will force air downwardly past the whistle 19 and into the reservoir 10 which, being yieldable, will expand sufficiently to receive the additional quantity of air. When the body 17 is released so that it can assume its natural position, the pressure of air in the reservoir 10 will cause the air therein to move upwardly through the leg 15 and effecting a vibration of the reed 25. It will, therefore, be evident that at each time the body 17 is collapsed, the whistle 19 will be actuated by movement of air in one direction and, in the present instance, in a downward direction toward the reservoir 10 and when the body 17 is released so that it may assume its natural position, the pressure of air in the reservoir 10 will assure a sounding of the reed 18. While, in the present instance, the animal 14 has been constructed in the form of a donkey, which is symbolic of one of the political parties in this country, it is, of course, understood that the configuration of this animal 14 may be varied, at will.

While I have shown a flap valve 34 mounted on the inner end of the whistle 19 it will, of course, be understood that if desired a yieldable reed similar to the reed 25 may be used in place of the check valve 34 so that, in addition to preventing the movement of air in the direction of the body 17 through the leg 16, the yieldable reed will produce a sound which is in addition to the sound produced by the whistle 19. This substitute reed may simulate the sound produced by an animal different from the animal shown in Figure 1.

It is, of course, understood that various changes and modifications may be made in the details of construction and design of the above specifically described embodiment of this invention without departing from the spirit thereof, such changes and modifications being restricted only by the scope of the following claims.

I claim:—

1. A sounding toy comprising a pair of spaced apart hollow yieldable bodies, a pair of spaced apart hollow connecting means connecting the bodies together, a sounding device in each of said connecting means, and a check valve carried by one of said sounding devices.

2. A sounding toy comprising an inflatable body, an animal provided with hollow legs and a hollow body mounted on the inflatable body, a sounding device in each hollow leg, and a check valve in one leg.

3. A sounding toy comprising a pair of yieldable bodies, a pair of hollow connecting members connecting the bodies together, a sounding member in one of said connecting members and operable by movement of air in one direction through said one connecting member, and a second sounding member in the other connecting member operable by movement of air in a direction reverse from the movement of air in said one connecting member, and a check valve in one of said connecting members.

4. A sounding toy comprising a yieldable reservoir, means for filling the reservoir with air, a hollow body, a pair of hollow connecting members connecting the hollow body with the reservoir, said hollow body being of yieldable construction, a sounding device in one of said connecting members and operable by movement of air in one direction through said one connecting member, a horn carried by said sounding device, a second sounding device in the other connecting member and operable by movement of air in a direction reverse from the movement of air in said one connecting member, and a check valve in one of said connecting members.

5. A sounding toy comprising a hollow yieldable body, an intake nipple carried by said body, a closure for said nipple, an animal having the legs thereof mounted on the reservoir, said legs being of hollow construction and communicating with the interior of the animal and the interior of the reservoir, a sounding device in each leg, said sounding devices being operable by movement of air from the reservoir through a leg into the body of an animal and one sounding device being operable by movement of air in a reverse direction from the other sounding device, and a check valve in one of said legs.

HOMER L. COLE.